United States Patent [19]

Angles et al.

[11] Patent Number: 4,650,581

[45] Date of Patent: Mar. 17, 1987

[54] APPARATUS FOR SEPARATING A PHASE DISPERSED BY EMULSION OR BY SUSPENSION IN A CONTINUOUS PHASE

[75] Inventors: Michel Angles, Lescar; Pierre Hoornaert, Saint-Pierre-de-Chandieu; Alain Audouin, Craponne; Henri Roques, Portet-sur-Garonne; Yves Aurelle, Aucamville; Louis Lopez, Roquettes, all of France

[73] Assignee: Elf France, S.A., Paris, France

[21] Appl. No.: 652,857

[22] Filed: Sep. 21, 1984

[30] Foreign Application Priority Data

Sep. 21, 1983 [FR] France ................................ 83 15120

[51] Int. Cl.⁴ ............................................ B01D 17/022

[52] U.S. Cl. ................................ 210/398; 210/493.4; 210/497.1; 210/506; 210/DIG. 5

[58] Field of Search ............... 210/708, 799, 800, 802, 210/924, DIG. 5, 521, 398, 493.4, 497.1, 506

[56] References Cited

U.S. PATENT DOCUMENTS

| | | | |
|---|---|---|---|
| 3,006,480 | 10/1961 | Russell | 210/493.4 |
| 3,037,637 | 6/1962 | Bub | 210/493.4 |
| 3,876,544 | 4/1975 | Fowler | 210/DIG. 5 |
| 4,053,414 | 10/1977 | in't Veld | 210/DIG. 5 |
| 4,058,463 | 11/1977 | Bartik | 210/DIG. 5 |
| 4,102,785 | 7/1978 | Head et al. | 210/DIG. 5 |
| 4,156,601 | 5/1979 | Pieciak | 210/DIG. 5 |
| 4,220,544 | 9/1980 | McGrew | 210/DIG. 5 |
| 4,335,001 | 6/1982 | Yves et al. | 210/DIG. 5 |

FOREIGN PATENT DOCUMENTS

| | | | |
|---|---|---|---|
| 864311 | 2/1971 | Canada | 210/DIG. 5 |
| 48871 | 4/1977 | Japan | 210/DIG. 5 |
| 880537 | 10/1961 | United Kingdom | 210/DIG. 5 |
| 2047107 | 11/1980 | United Kingdom | 210/493.4 |

*Primary Examiner*—Benoît Castel
*Assistant Examiner*—Wanda L. Millard
*Attorney, Agent, or Firm*—Harold H. Dutton, Jr.

[57] ABSTRACT

The invention concerns an apparatus for separating a phase dispersed by emulsion or by suspension in a continuous phase of different density, comprising a coalescence enclosure 1 provided with an inlet 1*a* and with an outlet 1*b* which enters a separation enclosure 4, the coalescence enclosure 1 assuming the shape of an elongated surface of revolution about an axis XX′ slanted with respect to the vertical and containing at least one rigid or semi-rigid sheet 7 rolled up about the inclined axis XX′ to form windings of which the generatrices extend along the enclosures, these windings being spaced apart and substantially covering all of the free cross-section of the enclosure; this sheet in particular may be rolled up in a spiral and may consist of a material preferentially wetted by the dispersed phase.

18 Claims, 12 Drawing Figures

Y
Y'
12
11c
11b
11
11a
I
10
8
-4a-
X
9
1b
4
1
7
6
5
2
3
1a

C
17
18
19

20
31

21

18
17a
17

28
21
X'
30
D
29
23
24
D
26
X
25

23
R
30

% HC
0
5 10
10 20
15 30
20 40
25 50
30 60
35 70
40 80
45 90
50 100
5
10
15
20
25
30
35
40
45
50
γ
α
β

APPARATUS FOR SEPARATING A PHASE DISPERSED BY EMULSION OR BY SUSPENSION IN A CONTINUOUS PHASE

This invention concerns an apparatus for separating a phase dispersed by emulsion or by suspension in a continuous phase of a different density. It applies particularly, but not exclusively, to separating hydrocarbons or fatty bodies dispersed in an aqueous effluent.

BACKGROUND AND OBJECTS OF THE INVENTION

So-called laminar decanters are known, which comprise a decanting basin within which is arrayed a set of parallel and inclined plates dividing the basin into a plurality of elementary decanters. Such an arrangement makes it possible to limit the height of decanting for each elementary decanter, the cut-off diameter and the efficiency of such equipment depending on said decanting height. Such laminar decanters enjoy a cut-off diameter which is substantially lower compared with the conventional decanters and furthermore good efficiency. A well known laminar decanter is the PPI type (Parallel Plate Interceptor) developed by SHELL Corp. in the petroleum field (British Patent No. 1,428,403). Variations are described in the following patents: Germany No. 2,512,291; U.S. Pat. No. 4,132,651; Britain No. 1,535,282; Europe No. 80.401227.6 (published as #0.026.122).

However, to achieve large decanting areas, the designers call for bulky apparatus generally permanently fixed in large-scale decanting basins.

Moreover refractionating of the hydrocarbon phase is noted in such apparatus when said phase arrives at the high part of the decanting plates. This refractionating action restricts the efficiency of separation and is the more pronounced the lower the interface tension between the dispersed and the continuous phases.

Again, such apparatus is poorly fitted to treat effluents containing suspended solid matter, in which case it tends to rapidly clog.

Each apparatus is fitted to one type of emulsion with specific granulometry, lacking any flexibility to ensure the separation of emulsions of different granulometries.

The object of the present invention is to offer an improved separation apparatus making use of the laminar decanter principle but free of their above cited drawbacks.

One object of the invention in particular is to provide a compact apparatus with a very high decanting area, of relatively small dimensions, which can be operated as a mobile facility at the very site of the sources of pollution in order to immediately recover a dispersed phase (hydrocarbon, oil or other) which is emulsified or suspended in an effluent (in particular an aqueous effluent).

Another object is to limit the re-fractionating phenomena so as to achieve high separation efficiencies even at high discharge rates or with a low interface tension between the phases.

Another object is to provide a modular apparatus capable of adapting with high flexibility to different emulsions whether or not loaded with suspended solids.

DESCRIPTION OF THE INVENTION

To that end the separation apparatus object of the invention includes at least one coalescence enclosure provided with an emulsion inlet and an outlet for the coalesced phase and continuous phase. In the present invention, each coalescence enclosure assumes a generally elongated surface of revolution about an axis slanted with respect to the vertical by an angle approximately between 30° and 70°; the inlet and the outlet of the enclosure are located at its low and high ends and said enclosure contains at least one rigid or semi-rigid sheet wound around said slanted axis to form a plurality of windings, where the generatrices of said windings extend along the enclosure between its inlet and outlet, said windings are spaced apart by spaces open at the lower and the higher part at or opposite the inlet and outlet of the enclosure, said windings substantially cover all of the enclosure's cross-section.

Preferably each coalescence enclosure is cylindrical. Said enclosure may contain a single sheet rolled up as a spiral from its slanted axis to its cylindrical wall. It may also contain several sheets wound one within the other in the form of concentric cylindric surfaces kept spaced apart in order to maintain the above cited spaces between windings.

The above cited sheet(s) can be kept in place by end disks located near the inlet and outlet of the enclosure and designed to position the rolled-up sheets while maintaining their mutual spacings.

In another embodiment mode, a spacing structure made of corrugated or embossed sheet metal, solid or perforated, is placed between the windings of the sheet(s) in order to maintain the above cited spaces between these windings. (It should be noted that the British Patent No. 2,020,189 describes apparatus for treating effluents which prior to coalescence eliminates flow turbulence using a helical structure with a vertical axis; however this vertically arranged structure is unfit to provide any coalescence by the principle of laminar decanters and its function is different, namely, merely spreading the effluent to stabilize its flow rate.)

In the case mentioned above of a single sheet rolled up in a spiral, this sheet may consist of a pre-formed sheet merely held in place by friction against the cylindrical wall of the coalescence enclosure.

As will be better understood below, the invention leads to a very compact apparatus with a very high decanting area (formed by the rolled-up sheets) with regard to the overall dimensions of the apparatus.

It should be borne in mind too that the apparatus can be used both with regular emulsions, for instance hydrocarbon emulsions in water, and for inverted emulsions, for instance emulsified water in hydrocarbons. In the former case, the effluent inlet is located at the lower part of the enclosure: the dispersed-phase droplets coalesce along the windings and ascend as films toward the high generatrices of these windings as far as the outlet located at the upper part.

In the latter case, the effluent inlet is located at the upper part and the outlet of the continuous and coalesced phases is located at the lower part, the phenomena being reversed. In both cases the coalesced drops concentrate along the generatrices of the windings which they leave in the form of very large drops near the zones of small areas, whereby the refractionating phenomena are restricted.

In another feature of the invention improving the separation efficiency of the apparatus, the sheet(s) contained in the coalescence enclosure is (are) made of a material preferentially wetted by the dispersed phase; in the case of a hydrocarbon emulsion, this (these) sheet(s) consist(s) of a lipophilic material, advantageously a fluorocarbon plastic.

In an embodiment particularly significant in certain applications, layers consisting of two different materials are sequentially inserted in the coalescence enclosure, where one layer is preferentially wetted by one phase and the other layer by the other phase. In the case of a corrugated or embossed structure sandwiched between the windings of a helical sheet, this sheet then is made one of the materials, in particular a material wetted preferentially by the dispersed phase, whereas the spacing structure is made of the other material, in particular the material which is preferentially wetted by the continuous phase. In the case of concentric cylindrical windings, the sheets of the material preferentially wetted by the dispersed phase alternate with the sheets of the material preferentially wetted by the continuous phase.

These embodiments are especially advantageous to separate a viscous or high viscous dispersed phase and allow restricting choking the gaps within which moves the dispersed phase.

As regards the application wherein a dispersed hydrocarbon phase is separated from a continuous aqueous phase, one of the used materials, namely the lipophilic one, advantageously consists, as already mentioned, of a fluorocarbon plastic, the other material, namely the hydrophilic one, being stainless steel.

In another feature of the invention, the coalescence enclosure is associated with a separation enclosure into which it enters at its outlet; this separation enclosure is provided with:

a guide means extending vertically from the coalescence enclosure outlet and comprising a lining made of a porous or comminuted material, means for withdrawing the continuous phase which issue into the separation enclosure near the free end of the guide means, and means for withdrawing the continuous phase which issue into the separation enclosure at the periphery of the guide means, said withdrawing means being designed to remove the phases following the separation, so that the interface between said phases be located at an intermediary height of the guide means.

The above mentioned lining advantageously consists of a material preferentially wetted by the dispersed phase; this lining guides the coalesced phase, particular in the form of liquid filaments, from its exit at the windings to the decanted layer; the refractionation phenomena at the exit of the windings therefore are wholly suppressed.

In the case of one sheet wound as a spiral, it is also possible to suppress almost totally the residual phenomena of refractionation by making said sheet rotate about its inclined axis in the direction corresponding to the winding direction of this spiral, from its periphery toward its center. The dispersed-phase films thereby are made to advance (somewhat similarly to a worm screw) toward the end generatrix of the spiral, whereby there is a significant increase in the concentration of the dispersed phase at the exit of the windings and whereby the refractionation phenomena are either wholly suppressed or substantially limited without there being a need for guide means such as described in the preceding variation.

The tubular enclosure of the invention and its windings permit designing a modular-type apparatus wherein several enclosures are interrelated and removably mounted to one another so as to be sequentially crossed by the emulsion. The windings of the sheets contained in the enclosures may assume different pitches (spaces between windings), where these pitches in each application are fitted to the separation problem to be solved. Those enclosures containing the windings with the biggest pitches shall be upstream with respect to the emulsion flow, whereby, on one hand, apparatus clogging is reduced in the case of the emulsion containing suspended solid matter, and on the other hand, the cut-off diameter is lowered from upstream toward downstream (thanks to a progressive decrease of the decanting height) in order to allow increasingly smaller droplets to coalesce as the emulsion advances through the apparatus.

Be it noted that this series arrangement; makes it possible to achieve the desired efficiency for a given emulsion by using enclosures with a diameter the same as that of the effluent conduits and by providing the required number of enclosures. In such a case the separation apparatus assumes an appearance similar to that of the other segments of effluent conduits.

DESCRIPTION OF THE DRAWINGS

The invention shall be better understood by reading the description below in reference to the accompanying drawings showing several illustrative but non-restrictive embodiments; these drawings are an integral part of the description.

DESCRIPTION OF THE PREFERRED EMBODIMENTS

The illustrative embodiment shown in FIGS. 1, 2, 3 and 4 separates an emulsified phase in a continuous phase of higher density, for instance a hydrocarbon emulsion in an aqueous effluent; this embodiment includes a coalescence enclosure 1 with an elongated cylindrical shape of which the axis XX' slants to the vertical at an angle advantageously between 40° and 50° and essentially 45°.

This coalescence enclosure may be made of any suitable material, in particular a metal.

At its open low end forming an effluent inlet 1_a_, the enclosure comprises a peripheral collar 2 acting as a flange on which is mounted an effluent supply pipe 3 which in this case is associated with a flow-spreading conical segment.

Figure 1:
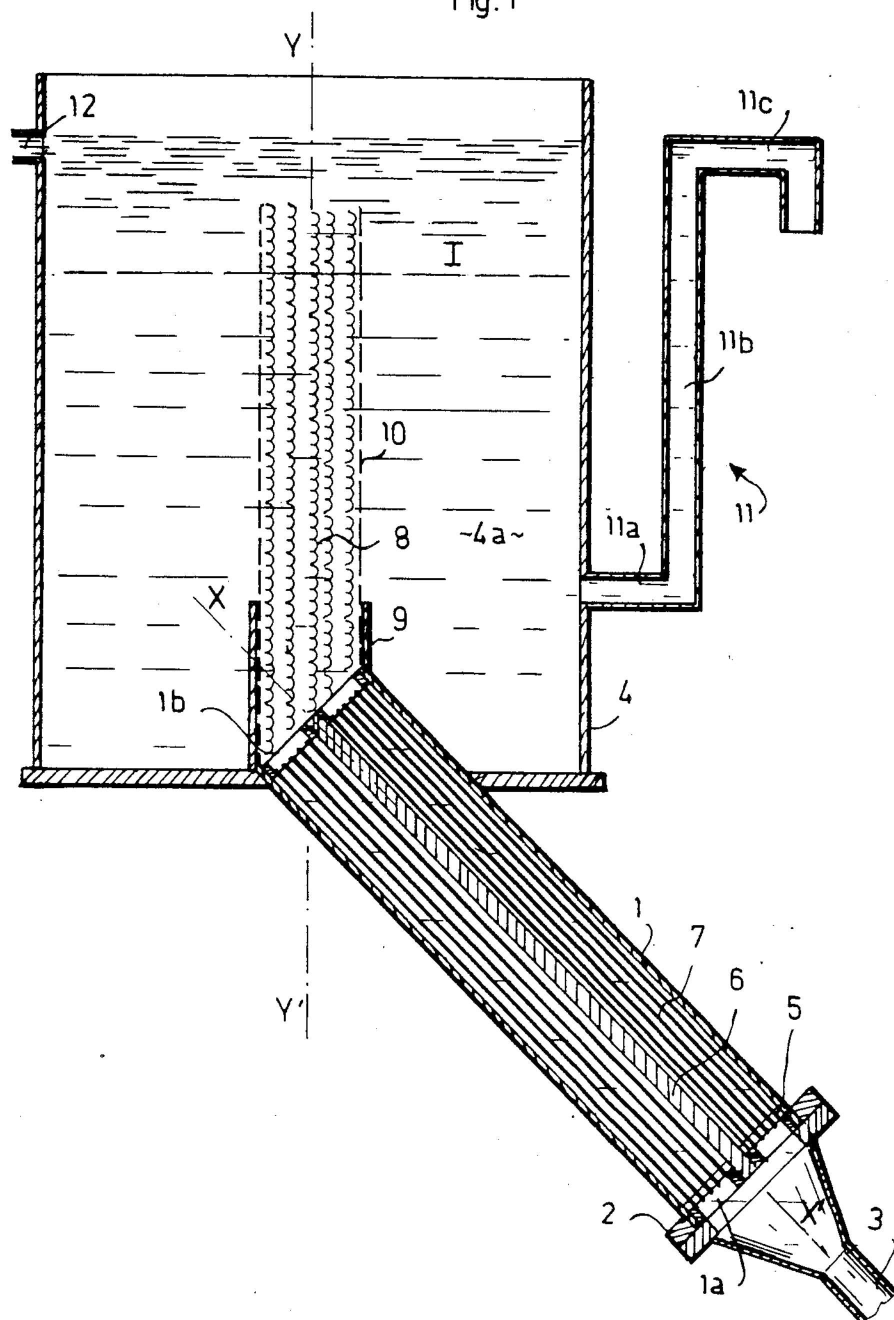
FIG. 1 is a schematic section through an axial vertical plane of a first embodiment mode of the apparatus of the invention.

At its upper part, the coalescence enclosure 1 is connected (in particular by welding) to a cylindrical separation enclosure 4 with a vertical axis YY'. The high end of the coalescence enclosure 1 is open, forming an outlet 1*b* for the coalesced phase and the continuous phase, and entering the lower part of the separation enclosure 4, as shown in FIG. 1.

Figure 2:
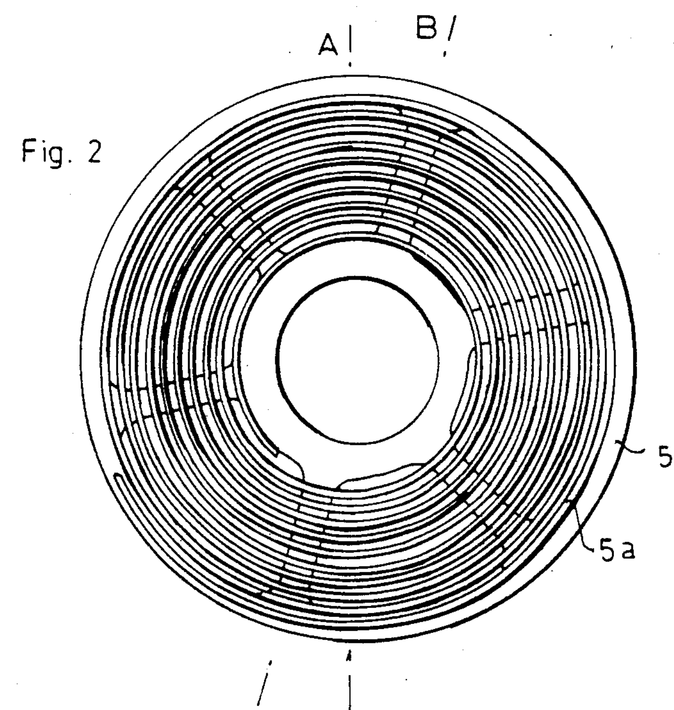
FIG. 2 is a front view of one of the components of this apparatus.
Figure 3:
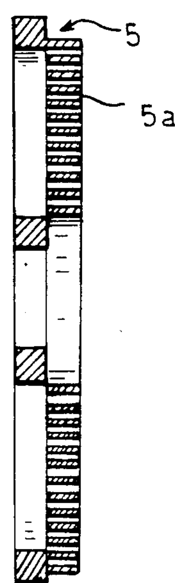
FIGS. 3 and 4 are detailed sections respectively in planes A and B of said component.
Figure 4:
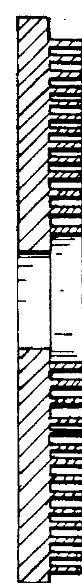
Figure 4A:
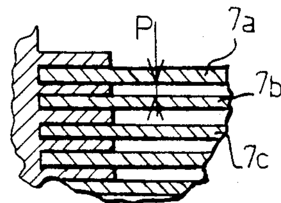

Also, the coalescence enclosure 1 is provided near its inlet 1*a* and its outlet 1*b* with end disks such as 5 shown in detail in FIGS. 2, 3 and 4. These disks are joined by a rod 6 extending along the axis XX' and position the windings *7a, 7b* . . . of a semi-rigid sheet 7 rolled-up in a spiral.

To that end each end disk 5 comprises a helical groove 5*a* extending from its axial opening to its periphery, with a radial ribs supporting the small helical partition defining the groove 5*a*.

The semi-rigid sheet 7 is inserted by its two outer edges into the grooves 5*a* of the two end disks 5 and therefore forms a spiral of which the windings *7a, 7b, 7c* are separated by gaps "p" termed "pitch" (FIG. 4). The generatrices of these windings extend along the enclosure parallel to the slanted axis XX' between the inlet 1*a* and the outlet 1*b*. The gaps between the windings are open at the bottom and the top at the level of these inlets and outlets.

The windings of the sheet 7 cover all the free crosssection of the enclosure from the central rod 6 to the cylindrical wall of the enclosure; this sheet 7 is made of a plastic fluorocarbon (a lipophilic material preferentially wetted by the dispersed hydrocarbon phase).

The separation enclosure 4 entered by the coalescence enclosure 1 comprises a coalesced-phase guide 8 arranged vertically within this enclosure along its axis YY' and held in place at its base by a sleeve 9.

The guide extends up the high part of the separation enclosure 4 on part of its section in order to keep a peripheral chamber 4*a* around this guide.

A grid 10 made of a material preferentially wetted by the continuous phase (for instance made of a hydrophilic material such as stainless steel), surrounds the guide 8.

The guide 8 comprises a lining itself made of a material which is comminuted and preferentially wetted by the dispersed phase. Preferably it is provided with a high vacuum coefficient and may consist of a hydrophobic lining of the type "Multiknit" (made by TISSMETAL).

The separation enclosure 4 is provided, on one hand, with continuous-phase removing means 11 entering the peripheral chamber 4*a* at the low part of the enclosure, and on the other hand withdrawing means 12 for the dispersed phase, entering the high part of the enclosure. These withdrawing means are designed to so withdraw the separated phases that the interface 1 between them is located at an intermediary level of the height of guide 8. In this manner this guide is always immersed by its upper part in the upper layer of the already decanted hydrocarbon.

In this example, the withdrawing means 12 merely comprises a conduit into which flows, i.e. overflows the hydrocarbon and which issues into the enclosure 4 above the upper end of the guide 8. The withdrawing means 11 comprises a pipe 11*a* issuing into the lower part of the enclosure 4 and extending by a rising pipe 11*b* equipped with an upper overflow elbow 11*c*.

Experiment has shown that the apparatus of the invention as described above offers an excellent separation efficiency in spite of its reduced size.

The helically wound sheet 7 constitutes a very large decanting surface; its inclination at 45° is a good tradeoff allowing simultaneously to benefit from a proper gravity evacuation of the separated hydrocarbon and a reduced decanting height ($p\sqrt{2}$), determining a good cut-off power of the apparatus.

The hydrocarbon coalesced in the gaps separating the windings tends to migrate along them toward the upper generatrix of each of them and to ascend toward the outlet of the enclosure 1. At this outlet level, said coalesced hydrocarbon is present in the form of large drops (with diameters roughly one cm), which leave each gap near the high generatrix of the corresponding winding. These drops next are guided into the separation enclosure 4 by the guide 8, in the form of liquid filaments feeding the already coalesced upper layer. The water escapes literally from the guide and the hydrophilic nature of the grid 10 averts hydrocarbon entrainment even at high speed.

It should be borne in mind that the drop concentration at the upper generatrices of the windings and their ultimate guidance by the guide 8 totally suppress any refractionating phenomena at the outlet of the coalescence enclosure 1.

Figure 5:
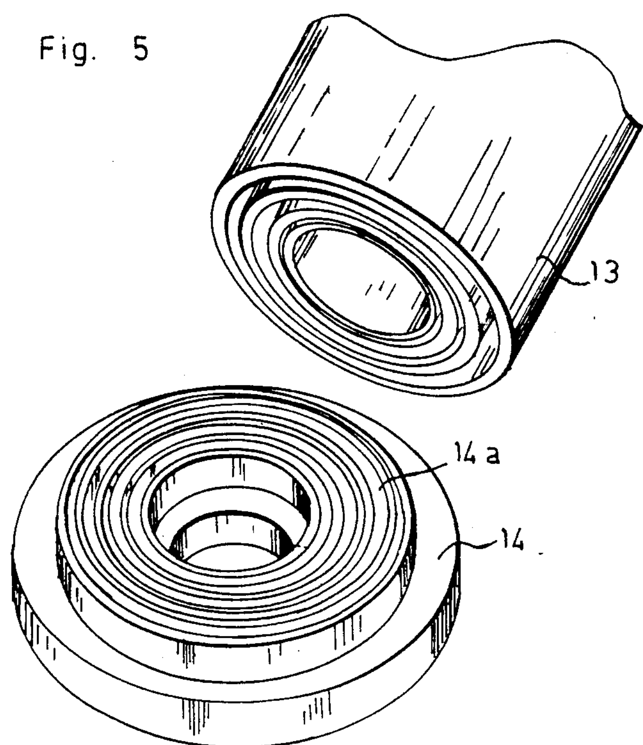
FIG. 5 is an exploded partial diagrammatic perspective of a variation of said apparatus.

By means of a partly exploded perspective, FIG. 5 illustrates a variation of the preceding apparatus, differing from it in that the coalescence enclosure comprises several fluorocarbon sheets 13 rolled one within the other as concentric cylindrical surfaces. In this example, these sheets are kept apart by end disks 14 similar to the preceding ones but now provided with a set of concentric circular grooves 14*a*.

The other means used in this variation, and its operation is similar to those previously described. If the dispersed phase to be separated were of high viscosity, advantageously (lipophilic) fluorocarbon sheets 13 would be provided, between which then are sandwiched sheets of the same geometry but made of (hydrophilic) stainless steel; thereby choking of the apparatus will be substantially restricted.

Figure 6:
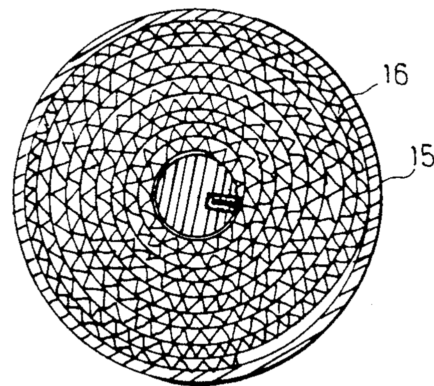
FIG. 6 is a schematic cross-section of another variation.

FIG. 6 illustrates a cross-section of another variation of the coalescence enclosure. In this variation, said enclosure (retaining its cylindrical shape inclined by 45° to the vertical) contains a fluorocarbon sheet 15 rolled up as a spiral, however a stainless steel corrugated sheet metal 16 is sandwiched between the windings of the fluorocarbon sheet. The amplitude of the waviness of this sheet metal determines the pitch "p" of the spiral. This sheet metal may be solid or perforated.

The sheet 15 therefore is rolled up in this manner into a spiral with a specific pitch without the necessity of providing end disks for support as in the other variations. This particular variation is doubly significant with respect to apparatus performance: one one hand the decanting area is increased by adding the corrugated sheet metal with a large deployed area, and on the other hand—as in the variation with the sandwiched sheets described above—the risk of choking relating to the helical windings is substantially reduced because of the hydrophilic nature of the sheet metal (low hydrocarbon adhesion to it).

Figure 7:
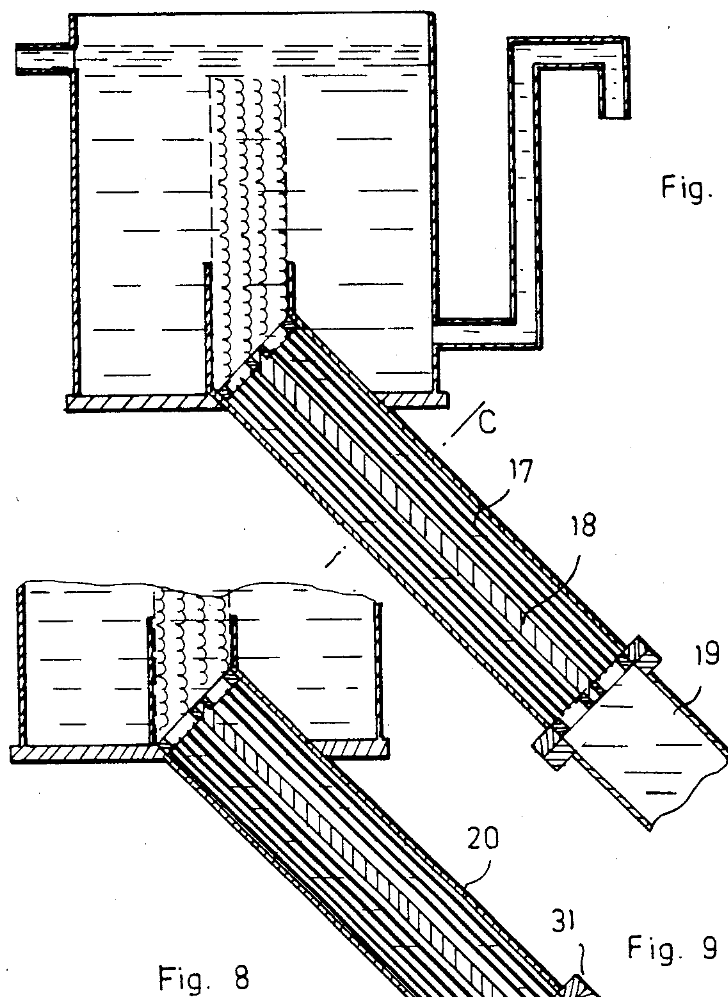
FIG. 7 is a diagrammatic axial vertical section of another embodiment.
Figure 8:
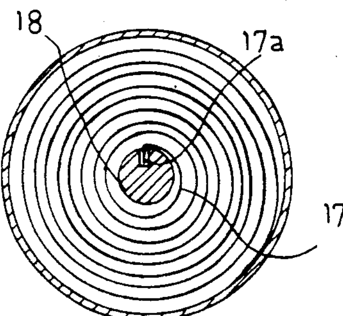
FIG. 8 is a cross-section in a plane C.

FIGS. 7 and 8 illustrate another apparatus embodiment. In this example, the coalescence enclosure contains a rigid fluorocarbon resin sheet 17 which is helically preformed so as to be of fixed geometry. This sheet is merely held in the cylindrical enclosure by the friction from its last winding against the wall of said enclosure. At the center, its end generatrix may form a strip 17*a* inserted into a slot in the central rod 18.

The insertion and removal of such a spiral sheet is extremely rapid, thereby offering all flexibility to the user to put in place that sheet of which the pitch matches the emulsion to be separated. As diagrammatically shown in FIG. 7, the coalescence enclosure may be of the same diameter as the effluent pipe 19 to externally merge with a conventional effluent pipe segment.

Figure 9:
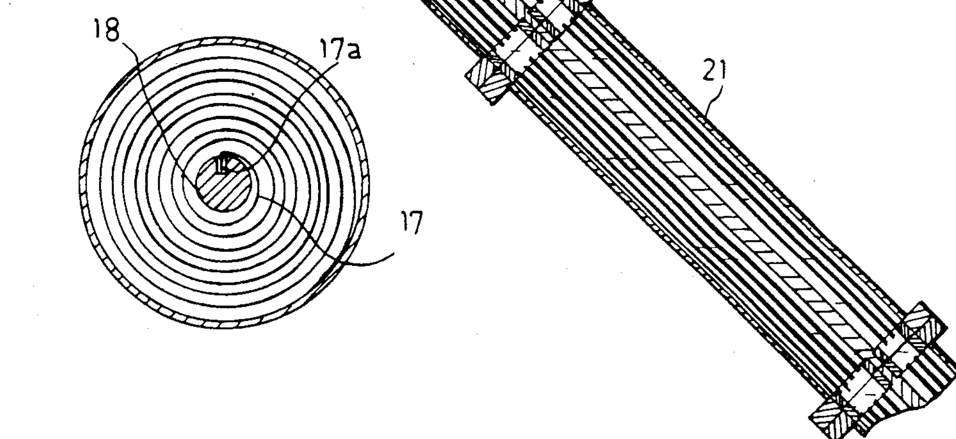
FIG. 9 is an axial section of another apparatus, illustrating the modular character of the apparatus of the invention.

Also, as shown by FIG. 9, several cylindrical coalescence enclosures 20, 21 detachably assembled by their flanges 31 one after the other can be provided in order to achieve a modular apparatus with the simultaneous benefit of great flexibility in adaptation to the intended application and excellent performance.

The winding pitch of the sheets contained in the various enclosures 20, 21 may differ from one enclosure to the next and may decrease from the upstream toward the downstream enclosures.

Figure 10:
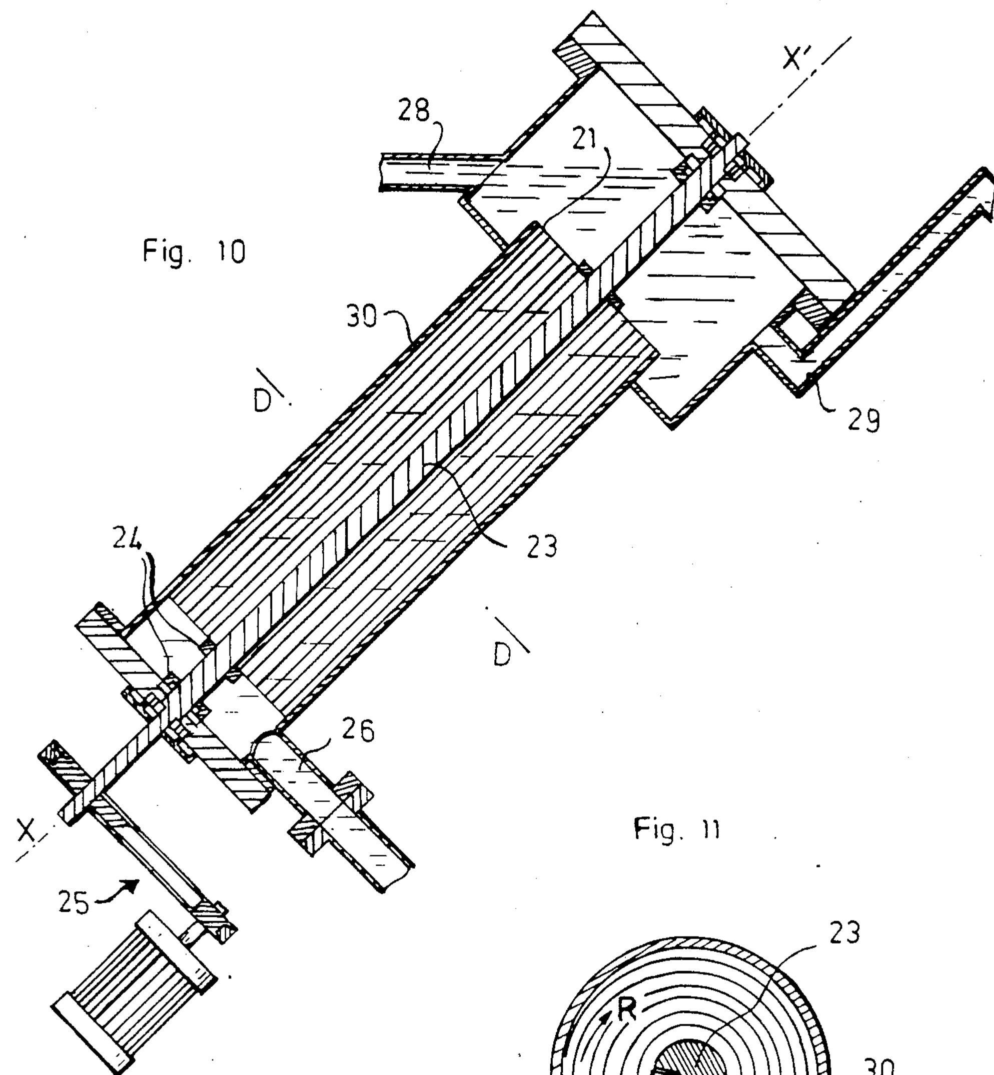
FIG. 10 is an axial section view in a vertical plane of another embodiment of the apparatus of the invention.
Figure 11:
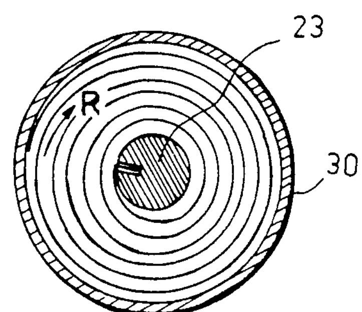
FIG. 11 is a cross-section in a plane D of the embodiment of FIG. 10.

Lastly FIGS. 10 and 11 respectively and schematically show a vertical section and a cross-section D of another embodiment of the apparatus.

In this embodiment, the cylindrical coalescence enclosure 22 contains a pre-formed spiral 30 of the type shown in FIGS. 7 and 8; this spiral is made to turn around its inclined axis in the direction of the arrow R (FIG. 11) corresponding to the spiral winding direction from its periphery toward its center.

For that purpose the sheet 30 is fixed along its central generatrix along a rotating shaft 23. This shaft extends along the inclined axis of the enclosure and is supported in sealed bearings such as 24 and driven into rotation by drive means 25 which in the example are a motor and a transmission belt.

The effluent to be treated arrives sideways at the base of the enclosure through a pipe 26.

The separation enclosure is replaced by a chamber 27 of enlarged diameter which includes the enclosure 22 at its high part; the hydrocarbon is withdrawn by overflow through a pipe 28 discharging at the upper generatrix of said chamber 27. The water is withdrawn by an elbow-pipe 29 issuing at the lower generatrix of said chamber 27.

In this embodiment, the rotation of the helical sheet 30 in the direction R causes the coalesced hydrocarbon to concentrate along the upper generatrix of the last winding(s) (peripheral or outermost windings); the hydrocarbon exits from the spiral through a zone $Z_1$ of very limited area in the form of a continuous column and at much reduced risk of refractionating.

The performance of the apparatus of the invention is illustrated in the examples below implemented with an apparatus such as shown respectively in FIGS. 1, 2, 3 and 4, and with the following dimensions:

| | |
|---|---|
| diameter of coalescence enclosure 1: | 10 cm |
| length of this enclosure | 30 cm |
| incline angle | 45° |
| spiral pitch | 0.2 to 0.3 cm |
| geometrically developed length of the windings | 340 cm |
| total winding area | 1.02 $m^2$ |
| clear area of inlet 1a or outlet 1b | 55 $cm^2$. |

The sampling withdrawals carried out to assess the performance take place at the inlet 1*a* and at the outlet 1*b* of the coalescence enclosure for the purpose of measuring the performance of the single coalescence enclosure 1 (obviously the performance of an apparatus equipped with the separation enclosure 4 and its guide 8 being still higher).

Figure 12:
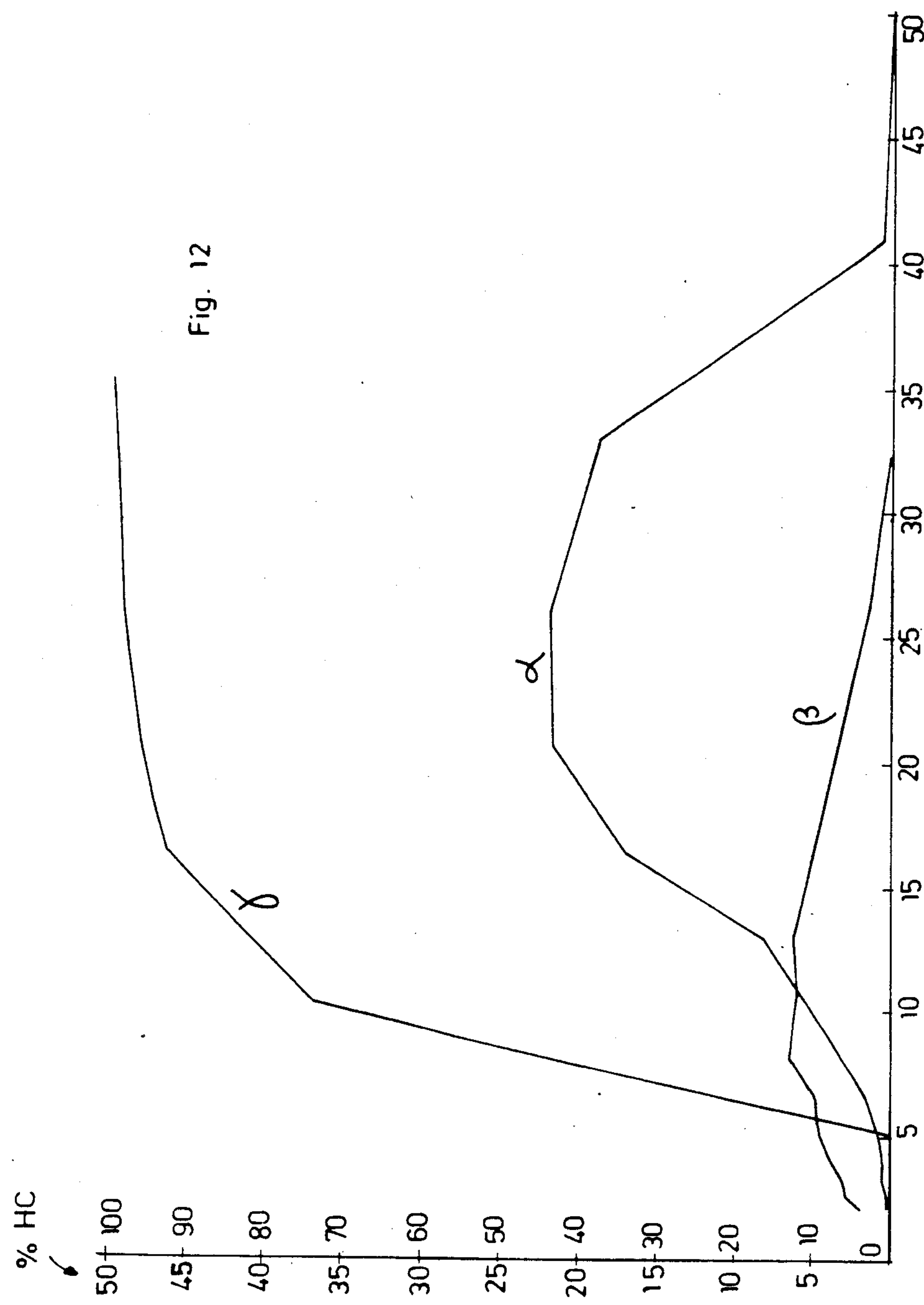
FIG. 12 is a plot showing apparatus performance for an implemented case.

In the Examples, the treated emulsion is a direct secondary aliphatic kerosene emulsion in water formed by drops with a granulometry between 5 and 45 microns and in a concentration of 1.3 kg of kerosene per liter of water; the granulometric distribution spectrum in percent by weight of this emulsion at the inlet of the enclosure 1 is plotted as the curve alpha of FIG. 12.

The curve beta represents the emulsion spectrum at the outlet of the enclosure 1 for a flow rate of 250 l/h, corresponding to a speed of 45 m/h.

The gamma curve represents the separation efficiency as a function of the drop diameters of the dispersed phase for the same flow rate of 250 l/h.

It may be noted that in this instance the cut-off diameter is about 30 microns, a remarkable effect for a laminar separator of this size (for equivalent speed, the cutoff diameter of the laminar separators of the state of the art is about 100 microns).

Other tests were performed at different flow rates and confirmed cut-off diameters much smaller than for those of the know separators:

| Flow-rate in liter/h | Cut-off diameter in microns |
|---|---|
| 45 | 16 |
| 72 | 17 |
| 128 | 26 |
| 450 | 41 |

We claim:

1. An apparatus for separating a dispersed phase emulsified or suspended in a continuous phase of different density comprising a coalescence enclosure having means defining an emulsion inlet and an outlet for the dispersed phase and the continuous phase, said coalescence enclosure comprising an elongated surface of revolution about an axis and said inlet and said outlet being-located at opposite ends of said enclosure, at least one sheet of material comprising a material preferentially wetted by one of said phases in said enclosure, said sheet being wound in a generally spiral manner so that the generatrices of said sheet are substantially parallel to said axis so as to form a coil of said sheet, the layers of said coil being positioned adjacent said inlet and said outlet, and said coil being of such an external diameter as to substantially fill said enclosure, whereby liquid flowing from said inlet to said outlet flows between the spaced layers of said coil.

2. A separation apparatus as in claim 1 and wherein said enclosure is cylindrical.

3. A separation apparatus as in claim 2 and wherein said coil comprises a plurality of said sheets wound in such a manner that said sheets are interleaved.

4. A separation apparatus as in claim 1 and wherein said enclosure includes end disks for positioning the windings of said at least one sheet for maintaining the spacing between layers.

5. A separation apparatus as in claim 3 and wherein one of said sheets is corrugated.

6. A separation apparatus as in claim 2 and wherein said at least one sheet comprises a preformed rigid sheet retained in position by friction against the wall of said enclosure.

7. A separation apparauts as in claim 3 and wherein said coil comprises one sheet of a material preferentially wetted by the dispersed phase and another sheet of a material preferentially wetted by the continuous phase.

8. A separation apparatus as in claim 5 and wherein said corrugated sheet comprises a material preferentially wetted by one of said phases and the other of said sheet comprised a material preferentially wetted by the other of said phases.

9. A separation apparatus as in claim 8 and wherein said corrugated sheet is preferentially wetted by the continuous phase and said other sheet is preferentially wetted by the dispersed phase.

10. A separation apparatus as in claim 1 and wherein said outlet is connected to a separation enclosure including a guide extending vertically from said outlet and comprising a lining of a porous material, means for withdrawing the dispersed phase from the upper end of said guide and means for withdrawing the continuous phase at the periphery of said guide, and wherein the interface between said phases is provided at an intermediate level of the height of said guide.

11. A separation apparatus as in claim 10 and wherein said lining is preferentially wetted by the dispersed phase.

12. A separation apparatus as in claim 10 and wherein the périphery of said guide comprises a grid of a material preferentially wetted by the continuous phase.

13. A separation apparatus as in claim 10 and including a plurality of said coalescence enclosures serially connected along said axis.

14. A separation apparatus as in claim 13 and wherein each of said coalescence enclosures includes a connecting flange at each end thereof.

15. A separation apparatus as in claim 13 and wherein the space between layers in the upstream-most coalescence enclosures is greater than the space between layers in the next downstream coalescence enclosure.

16. A separation apparatus as in claim 1 and wherein said axis is inclined with respect to the vertical at an angle of about 30° to 70°.

17. An apparatus for separating a dispersed phase emulsified or suspended in a continuous phase of different density comprising a coalescence enclosure having means defining an emulsion inlet and an outlet for the dispersed phase and the continuous phase, said coalescence enclosure comprising an elongated surface of revolution about an axis and said inlet and said outlet being located at opposite ends of said enclosure, at least one sheet of material in said enclosure, said sheet being wound in a generally spiral manner so that the generatrices of said sheet are substantially parallel to said axis so as to form a coil of said sheet, the layers of said sheet in said coil being spaced apart and the ends of said coil being positioned adjacent said inlet and said outlet, and said coil being of such an external diameter as to substantially fill said enclosure, whereby liquid flowing from said inlet to said outlet flows between the spaced layers of said coil, and means for rotating said coil about said axis in a direction corresponding to the winding direction of said coil.

18. A separation apparatus as in claim 17 and wherein the radially innermost end of said at least one sheet is secured along its central generatrix to a rotating shaft extending along said axis, bearing means for supporting said shaft in said coalescence enclosure, and drive means for rotating said shaft.

* * * * *